Oct. 3, 1961  C. D. MILLER  3,002,424
FILM FEEDING DEVICE
Filed Nov. 13, 1957  3 Sheets-Sheet 1

INVENTOR.
CARL DAVID MILLER
BY
Jerome R. Cox
ATTORNEY

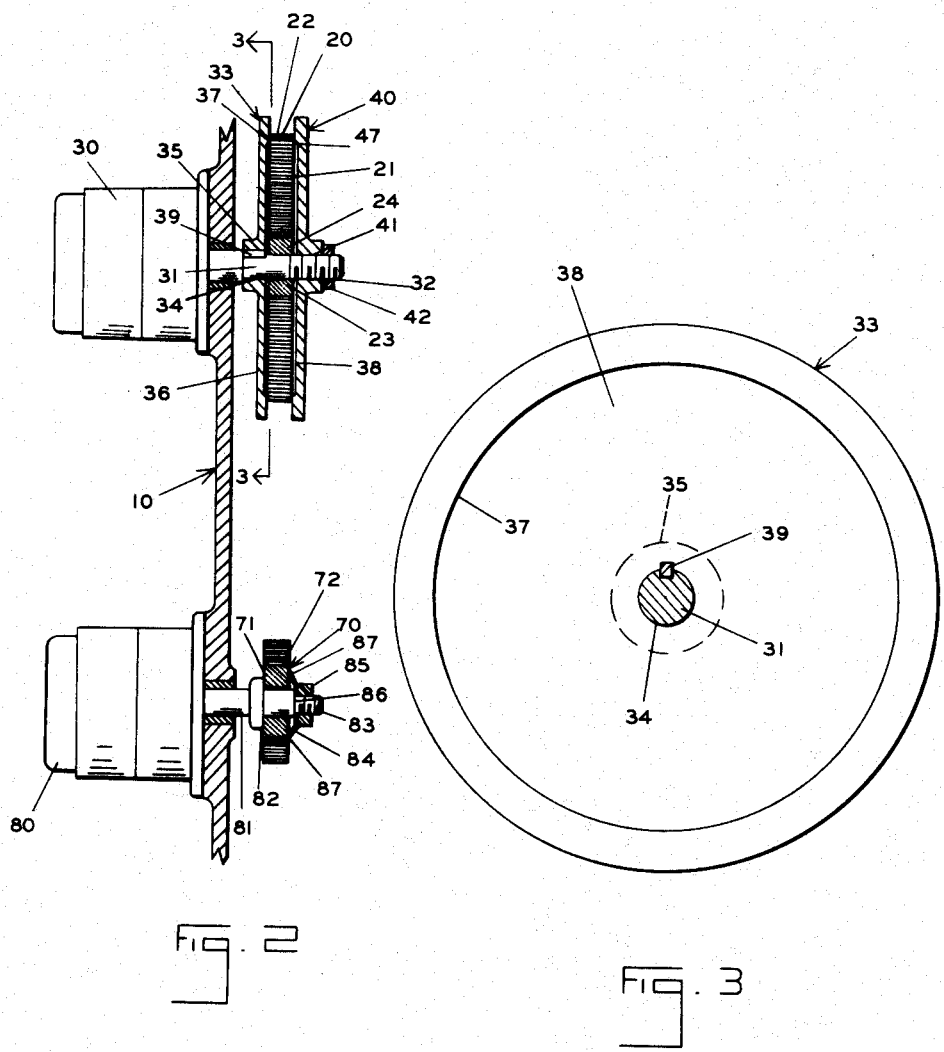

Oct. 3, 1961  C. D. MILLER  3,002,424
FILM FEEDING DEVICE
Filed Nov. 13, 1957                                        3 Sheets-Sheet 3

INVENTOR.
CARL DAVID MILLER
BY
Jerome R. Cox
ATTORNEY

United States Patent Office 3,002,424
Patented Oct. 3, 1961

3,002,424
FILM FEEDING DEVICE
Carl David Miller, Columbus, Ohio
(4546 Rhode Island St., San Diego 16, Calif.)
Filed Nov. 13, 1957, Ser. No. 696,275
11 Claims. (Cl. 88—17)

The invention disclosed herein and illustrated in the drawings appended hereto relates to film feeding apparatus for photographic cameras.

There are many instances where it is desirable to move a photographic film with respect to an optical image at a substantially constant speed and at relatively high velocities. For example, when it is desired to obtain sequentially timed photographs of rapidly moving objects or of rapidly changing states of matter.

The film threading and feeding devices which are known to the inventor and in present use in cameras for making either continuous photographic exposures or sequentially timed exposures do not function satisfactorily when employed to move a filmstrip at relatively constant velocities in excess of a few feet per second.

The length of film which is available for a single operation of such high speed photographic cameras is limited to the capacity of a spool which can be housed, mounted and rotated with equipment which is practical from the standpoint of bulk, weight and power requirements. As the diameter and/or the mass of such film supply spool is increased, the total length of film which must be drawn off the spool, before the desired linear film speed is reached, also increases. When higher film velocities are desired, experience has shown that the entire film capacity is nearly exhausted before the reel can be accelerated to a state of substantially uniform rotation at the desired velocity. The practical result has been to limit the film speed which can be made available in a camera which employs a moving film.

Objects

One of the objects of my invention is to provide in combination a camera, a supply of photographic film, and apparatus capable of moving substantially all of said film supply through the position of the optical image at a relatively high velocity and simultaneously exposing said film at a substantially uniform rate.

A further object of my invention is to provide in a camera means for accelerating the film supply of a camera to a desired high velocity while retaining the entire film supply unexposed for later exposure at a substantially uniform rate.

A further object of my invention is to provide in a camera means for so accelerating the film supply while all unexposed to a desired high velocity and then diverting successive portions of the film to an exposing position at a uniform high velocity throughout the length of said film.

A further object of my invention is to provide in a camera, means for intercepting a strip of film while it is moving at high velocity and for changing the direction of the motion of such film without substantially changing its velocity.

A further object of my invention is to provide in a camera, means for engaging a film upon a takeup reel while both the film and the reel are in motion at relatively high velocities.

A further object of my invention is to provide in a camera, means for disengaging a rotating roll of film from its source of torque so as to permit the film contained in said roll to be moved by the force of its inertia from the roll to a rotating takeup spool at a uniform velocity.

A still further object of my invention is to provide in a camera, means for guiding the motion of a film through the position of an optical image with a minimum of frictional resistance.

Further objects and features of my invention will be apparent from the subjoined specification and claims when considered together with the attached drawings.

Drawings

In the drawings which disclose an embodiment of my invention:

FIG. 2 is a view in section taken along lines 2—2 of FIG. 1;

FIG. 3 is a view in section taken along lines 3—3 of FIG. 2;

Detailed description

Figure 1:
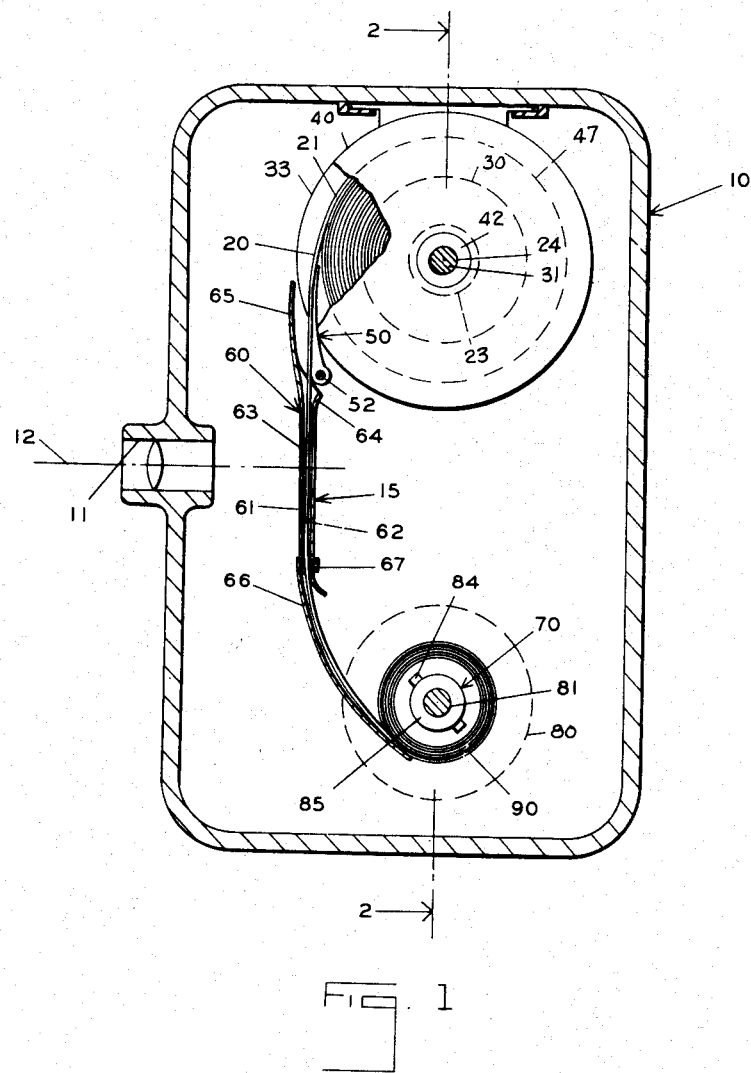
FIG. 1 is a side view in section showing a camera incorporating the film feeding apparatus of my invention.

Referring to the drawings for a detailed description of one embodiment of my invention, it may be seen that I have shown in FIG. 1, a photographic camera 10 having an opening 11 for admitting light along an optical axis 12 of said camera, and a photographic film 20 of conventional configuration wound in the usual manner on a spool 23 for forming a film supply reel 21 of coiled configuration. Associated with said camera 10 and film 20 I have shown apparatus generally designated as 15 for moving film 20 across the optical axis 12 at a constant linear velocity so as to expose substantially all of film 20 at a substantially uniform rate.

Apparatus 15 comprises motor 30 for accelerating supply reel 21, drive plate member 33, pressure plate member 40; means 50 for at times intercepting film 20 during rotation and for deflecting the movement of film 20 from the rotational path of reel 21; means 60 for guiding film 20 across optical axis 12 thereby permitting photographic exposure of said film; take-up spool 70 for engaging and rewinding film 20 after such photographic exposure; compensating motor 80 for initially rotating spool 70 at a predetermined velocity when film 20 is not in engagement with spool 70; and means 90 for transmitting from motor 80 to spool 70 only predetermined increments of torque to compensate substantially for frictional losses occurring within apparatus 15 when film 20 is in engagement with spool 70.

The drive plate member 33 is driven by motor 30 to initially rotate supply reel 21 at the desired speed and the pressure plate 40 cooperates with plate 33 so as to retain the oppositely disposed circumferential edges of reel 21 in frictional engagement with plate 33 for rotating reel 21 and for retaining film 20 in the coiled configuration of reel 21. Film guide means 60 includes a film conduit 61 having an aperture 63 at the position of its intersection with optical axis 12. It should be here noted that the initial angular velocity of spool 70 under the impetus of motor 80 is greater than the initial angular velocity of reel 21 as will be more fully hereinafter described.

The above structure accomplishes the desired purposes so that film 20 is accelerated on reel 21 to a predetermined peripheral velocity, is disengaged from accelerating means 30 and is thereafter propelled at high speed solely by the inertia of film 20, across optical axis 12 and past aperture 63 at a substantially constant rate and is rewound in the exposed condition upon spool 70. Each of the foregoing means is further described in detail hereinafter.

Figure 4:
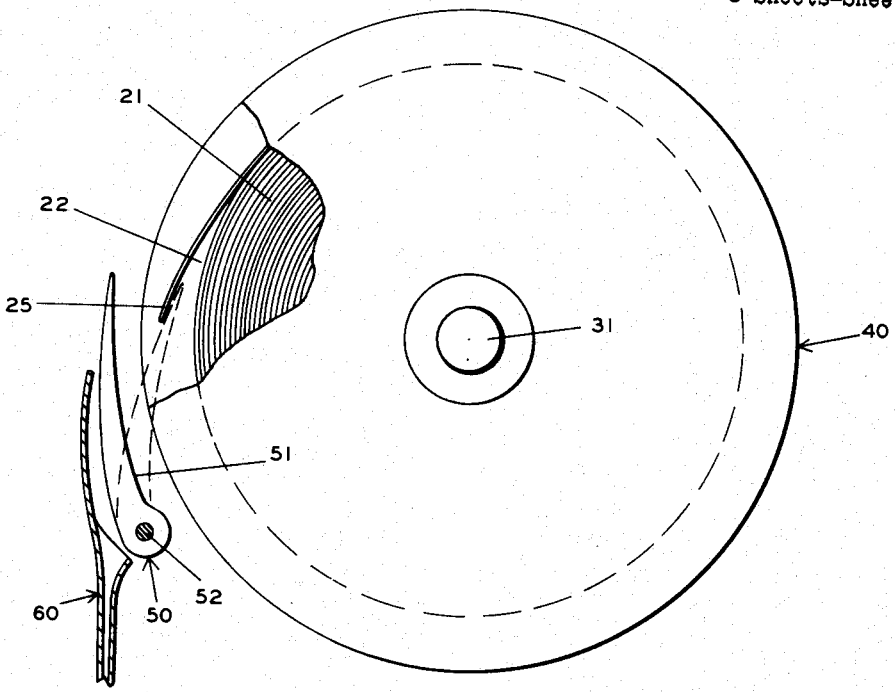
FIG. 4 is a fragmentary view similar to a portion of FIG. 1 showing on an enlarged scale the film supply and film interceptor with other parts broken away.

Referring to FIG. 2, I have shown film supply reel 21 comprising a suitable length of film 20 spirally wound in the conventional coiled configuration about supply spool 23 so as to be disposed in successive layers radially spaced from the axis of said spool and having an outer layer 22 terminating in an outwardly disposed leading end 25 (FIG. 4).

If spool 23 were a simple solid cylinder with no axial bore, it would ideally have the same density as film 20. When spool 23 is provided with the necessary or desirable axial bore and lateral recesses, as shown in the preferred embodiment of my invention, spool 23 is preferably formed of material having a density appropriate for providing the same moment of inertia as that of the simple solid cylindrical spool just described. Spool 23 is provided with an axial bore 24 having a diameter sufficient to permit reel 21 to be freely rotatable upon shaft 31 described hereafter.

Accelerating motor 30 (FIG. 2) is of conventional design, is secured by suitable means to the frame of camera 10 and is provided with a shaft 31 rotatably driven by motor 30 and projecting therefrom along an axis which may be perpendicular to a plane containing the optical axis of said camera. Shaft 31 is provided with suitable threads 32 adjacent its outer end. Film drive plate 33 is formed of suitable material with the generally circular configuration seen in FIG. 3. Plate 33 is provided with an axial bore 34 and a hub portion 35 projecting from its outwardly disposed plane face 36. Plate 33 is further provided with an annular ring 37 projecting inwardly from its inwardly disposed face 38 and disposed adjacent the circumferential edge of face 38. Ring 37 is formed with an inside diameter substantially equal to the outside diameter which supply reel 21 has when end 25 of film 20 is first engaged with spool 70 as is further described hereafter in detail. Plate 33 is secured by suitable key 39 for rotating with shaft 31 of motor 30.

Pressure plate member 40 (FIG. 2) is formed with a configuration similar to that of plate 33 as seen in FIG. 3 and is provided with annular ring portion 47 similar to portion 37 of plate 33. Plate 40 is further provided with axial bore 41 having suitable threads for being threadably engaged with threads 32 of motor shaft 31. A nut 42 threaded onto the threads 32 at the outer end of shaft 31 holds the plate 40 in position on shaft 31.

Reel 21 is positioned on shaft 31 intermediate plates 33 and 40 so as to be rotatable upon shaft 31 but having a determinable number of the outermost layers 22 of film 20, comprising that portion of film 20 required to extend along the path of film travel hereafter described from reel 21 to spool 70, cooperatively secured in frictional engagement between rings 37 and 47. The purpose of such frictional engagement is to permit reel 21 to be driven by plate 33 at all times when the outer layers of film 20 are in coiled relationship with reel 21 and to further permit reel 21 to be freely rotatable about shaft 31 when said determinable number of outer layers 22 have been unwound from reel 21.

Film intercepting and diverting means 50 (FIG. 4) comprises finger 51 formed with the general configuration shown in FIG. 4, said finger 51 being secured to suitable shaft 52 for being rotated about the axis of shaft 52 by a handle secured to shaft 52 and located outside the enclosure of camera 10. Thus finger 51 is at times rotated to a position in FIG. 4 suitable for permitting end 25 to rotate with reel 21 and at other times is rotated to the position shown in broken lines in FIG. 4 wherein finger 51 intercepts end 25, diverts the outer portion of film 20 from the rotational path of reel 21 and directs end 25 (and the following portion 22 of film 20) into film guide means 60.

Film guide means 60 (FIG. 1) comprises film conduit 61, guide plate 65 and guide spring 66, each of which is described hereafter in detail.

Figure 5:
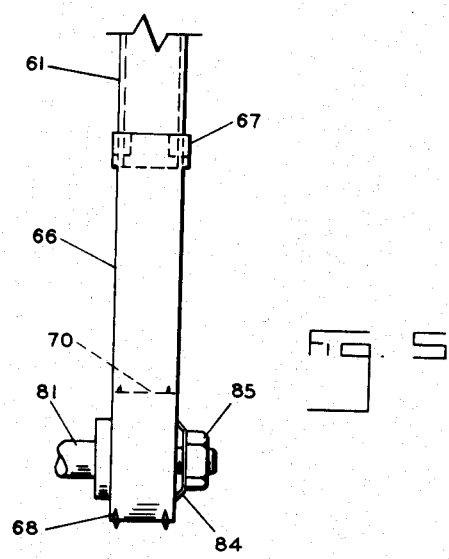
FIG. 5 is a fragmentary view of the lower end of the film guide, guide spring and takeup spool with other parts broken away.

Guide conduit 61 is preferably formed with a longitudinally extending central opening substantially rectangular in cross section having cross-sectional dimensions only slightly greater than the cross-sectional dimensions of film 20. Conduit 61 is further formed with an upper flared portion 64 and with an aperture 63 in at least one lateral wall adjacent opening 11 of camera 10 where conduit 61 intersects optical axis 12. Guide plate 65 is formed to any suitable configuration for guiding film 20 moving from reel 21 into conduit 61 and is secured at one of its ends to the flared portion 64 of conduit 61. Guide spring 66 is formed of appropriate resilient material with a plurality of longitudinally extending slots 68 (FIG. 5) for purposes later detailed. Spring 66 is secured to the lower end of conduit 61 by suitable means such as for instance spring collar 67. All surfaces of plate 65, conduit 61 and spring 66 which contact film 20 are preferably formed with a high surface polish for minimizing frictional losses.

Take-up spool 70 (FIG. 2) is formed of suitable material having a density determined as previously described for supply spool 23 and has the general cylindrical configuration shown. Spool 70 is provided with an axial bore 71 of suitable diameter and with a plurality of pairs of forwardly directed teeth 72 spaced about the circumferential surface of said spool. The teeth 72 work through the slots 68 (FIG. 5) for securing film 20 to spool 70.

Take-up motor 80 is of conventional design having a shaft 81 formed with annular shoulders 82 and 86 and threaded reduced portion 83 formed adjacent its outer end. Spool 70 is positioned on shaft 81 as shown in FIG. 2 with its inner plane face bearing upon shoulder 82. Spring 84 is secured in fixed position adjacent shoulder 86 of shaft 81 by suitable locking nut 85 threadably engaged on threads 83 of shaft 81. Bearing portions 87 of spring 84 bear upon the outwardly disposed plane face of spool 70 so as to frictionally drive said face. At all times when the counter torque exerted by spool 70 does not exceed the frictional resistance to slippage which is regulated by the tensional bias of spring 84, it drives at full speed. The tensional bias of spring 84 is such that predetermined increments of the positive torque of motor 80 and shaft 81 are transmitted to spool 70 while the negative torque caused by deceleration of spool 70 when film 20 is taken up about a constantly increasing circumference will cause spring 84 to slip relative to spool 70.

The primary purpose served by motor 80 is to bring spool 70 up to the desired speed before receiving the film 20. It also substantially compensates for frictional losses which occur in the transfer of film 20 from reel 21 to spool 70.

Before slippage of spring 84 with respect to spool 70 (as described above) occurs, spring 84 imparts only negligible power to spool 70 but it rotates spool 70 at the desired velocity. After slippage begins, spring 84 transmits substantial power to spool 70. Through the adjustment of nut 85 the force with which spring 84 bears upon spool 70 is regulated to that which is required to impart optimum increments of power to spool 70 for substantial compensation of power loss due to friction.

*Operation*

In the operation of my device an appropriate length of film 20 (FIG. 1) is wound on supply spool 23 in the conventional manner to form supply reel 21. Film 20 must be of sufficient length to form a reel 21 having a diameter greater than the inside diameter of embossed rings 37 and 47 (FIG. 2) of plates 33 and 40 respectively and must exceed such length by an additional amount equal to the length of film required to extend through guide means 60 and to become firmly impaled upon teeth 72 of take-up spool 70. Film 20 must not exceed the length just described by more than an amount sufficient to permit a few turns about spool 70 before the diameter of reel 21 is reduced to a value less than the inside diameter of rings 37 and 47. Film 20 is wound as tightly as practical on reel 21 so as to place the entire length of film 20 under tension.

Reel 21 (FIG. 2) is positioned in camera 10 with shaft 31 extending through bore 24 of spool 23 so as to place reel 21 adjacent drive plate 33 with annular ring 37 in contact engagement with outer layers of film 20 on reel 21. Pressure plate 40 is threadably engaged on shaft 31 and turned sufficiently tight against reel 21 to insure that the outer layers of film 21 will be secured in positive frictional engagement between cooperating rings 37 and 47 respectively of plates 33 and 40. In the embodiment shown in the drawings, shaft 31 is provided with a left-hand thread 32 to permit the tightening of plate 40 against film 20 by movement of plate 40 in the direction in which film 20 is wound about spool 23. Plate 40 is secured in place on shaft 31 by locking nut 42.

When reel 21 is thus securely engaged intermediate plates 33 and 40, end 25 of film 20 is positioned adjacent the circumferential edges of plates 33 and 40 and is held in such position by frictional engagement between the opposite lateral edges of film 20 and oppositely disposed rings 37 and 47.

Motor 30 rotates shaft 31 and drive plate 33 which drives reel 21. Reel 21 is thus accelerated until it attains an angular velocity necessary to impart any desired linear velocity to film 20 after deflection of end 25 to a non-circular path. When the desired angular velocity is attained, intercepting finger 51 is rotated to position the upper end of finger 51 intermediate plates 33 and 40 and adjacent reel 21 for engaging the rotating end 25 of film 20. When end 25 is engaged by finger 51, the end 25 and the following portions of film 20 which form the outer layers of reel 21 are removed from frictional engagement with sides 33 and 40 and are deflected from the path of rotary motion of reel 21 and into guided relationship with film guide means 60 (FIG. 1). Guide means 60 conducts film 20 downwardly across optical axis 12 which passes through aperture 63 in conduit 61. As continuously successive portions of film 20 pass aperture 63, light passing through opening 11 reaches film 20 for exposing said film. After film 20 is thus exposed it is conducted downwardly in conduit 61 and is then guided by guide spring 66 toward teeth 72 of rotating take-up spool 70.

Spring 66 serves only to guide end 25 of film 20 into position for being impaled by a pair of the rotating teeth 72. After film 20 is thus secured to spool 70, the drag of film 20 operating counter to the rotational movement of spool 70 will pull film 20 from the position of contact with spring 66 and toward a straight line path extending from the lower end of channel 61 to the periphery of reel 90.

Shaft 81 is driven by motor 80 and drives spring 84 in frictional engagement with the outer plane face of take-up spool 70. Spring 84 is tensionally biased toward spool 70, as previously described, to exert sufficient force to drive spool 70 when the spool is not engaged with film 20. Before engaging film 20 (as described hereafter) spool 70 is accelerated by motor 80, shaft 81 and spring 84 to a peripheral velocity greater than the predetermined maximum peripheral velocity at which reel 21 is rotated. Spool 70 is rotating at such velocity when end 25 of film 20 reaches spool 70 under the impetus of reel 21 and the guidance of spring 66.

When film 20 contacts spool 70, teeth 72 rotating with spool 70 impale end-portion 25 of film 20 and rotate end 25 about the axis of spool 70 so as to rewind the exposed portion of film 20 upon spool 70 in the form of a take-up reel 90 of exposed film similar in configuration to supply reel 21.

After film 20 is impaled on teeth 72, the outer layers 22 of reel 21 are deflected from reel 21 previously described. Neither driving plate 33 nor pressure plate 40 are thereafter in frictional engagement with reel 21. Reel 21 is therefore permitted to rotate freely about shaft 31 under the impetus of the inertia of film 20, which was previously accelerated by motor 30 as previously described.

Spool 70 is also rotating substantially at will about shaft 81 and substantially the entire length of film 20 will be transferred from reel 21 to take-up reel 90 at a linear velocity of the film occurring between reels 21 and 90 which is substantially constant.

In support of the theory of operation just described, to wit: that the film will all run from spool 23 to spool 70 at the same velocity provided no driving torque and no retarding torque is applied to spool 23, and provided the driving torque delivered to spool 70 by spring 84 is properly adjusted to match the total frictional loss of the film and the two film reels, I submit the following proof. In the proof it will first be shown that a constant linear velocity $v$ for film 20 between the two spools 23 and 70 will involve the same total kinetic energy throughout the entire process, provided film 20 remains taut.

By well known principles of mechanics, the rotational kinetic energy of film reel 21, including spool 23, at any instant will be $$E_a = \tfrac{1}{2} I_a \omega_a^2 \qquad (1)$$

where $I_a$ is the mass moment of inertia and $\omega_a$ is the angular velocity of supply reel 21, including spool 23. Likewise, $$E_b = \tfrac{1}{2} I_b \omega_b^2 \qquad (2)$$

where $E_b$ is the rotational kinetic energy, $I_b$ is the mass moment of inertia, and $\omega_b$ the angular velocity of take-up reel 90, including spool 70.

The total energy for both reels will be $$E = E_a + E_b = \tfrac{1}{2} I_a \omega_a^2 + \tfrac{1}{2} I_b \omega_b^2 \qquad (3)$$

Now, $I_a = \tfrac{1}{2} m_a r_a^2$ and $I_b = \tfrac{1}{2} m_b r_b^2$, where $m_a$ is the mass of supply reel 23, $m_b$ is the mass of take-up reel 90, $r_a$ is the outside radius of supply reel 21, and $r_b$ is the outside radius of take-up reel 90. And $$\omega_a = \frac{v}{r_a} \text{ and } \omega_b = \frac{v}{r_b}$$

Substituting these values for $I_a$, $I_b$, $\omega_a$ and $\omega_b$ into Equation 3, and letting $m_b = M - m_a$, where M is the total mass of both reels, $$E = \tfrac{1}{4} m_a r_a^2 \left(\frac{v}{r_a}\right)^2 + \tfrac{1}{4}(M - m_a) r_b^2 \left(\frac{v}{r_b}\right)^2 \qquad (4)$$

$$E = \tfrac{1}{4} m_a v^2 + \tfrac{1}{4}(M - m_a) v^2 \qquad (5)$$

$$E = \tfrac{1}{4} M v^2 \qquad (6)$$

As M, the total mass of both reels 21 and 90, must be constant, it is seen from Equation 6 that the total energy of the system can vary only with the velocity $v$ of film 20 between reels 21 and 90. It follows that if the velocity of the film between reels 21 and 90 remains constant then the total energy must remain constant, regardless as to how much of the film is on reel 21 and how much on reel 90 at any instant.

It is now obvious that so long as the film between reels remains taut, the velocity of that film must remain constant. For if the film between reels increased in speed, the angular velocities of both reels would have to become greater than they would otherwise be, and the kinetic energy of each reel would be increased. Conversely, as long as the film between reels remains taut, any decrease in its linear velocity would have to involve a decrease in angular velocity of each reel and a decrease in kinetic energy of each reel.

So it is now necessary to consider only the question as to how the film 20 between reels 21 and 90 could become loose.

With the structure as disclosed, having a spool 70 initially turning with higher peripheral velocity than the linear velocity of film end 25 at the time of impalement of end 25 upon teeth 72, an initial condition of tautness must be assumed. If the original taut condition is assumed at a time $t_0$, a condition of looseness at a later time $t_1$ could exist only if, between times $t_0$ and $t_1$, one or both of the following conditions occurred: (1) reel 21 accelerated rotationally more rapidly than necessary to pay out film from its surface at the rate $v$, or (2) reel 90 decelerated rotationally more rapidly than necessary to take up film on its surface at the rate $v$. But, because of the fact that film 20 is always leaving reel 21, the radius of reel 21 is always becoming smaller. Hence, the angular velocity of reel 21 must always increase if that reel is to continue to pay out film even as fast as the linear velocity $v$. As there is nothing but the tension of the film between reels to accelerate reel 21 angularly, it cannot reach the higher speed necessary to pay out film even at the constant rate $v$ without continuous tension in the film between reels.

Likewise, because of the fact that film is continuously passing onto reel 90, that reel is continuously increasing its radius, and for constant linear speed $v$ at its surface it must be continuously decelerated rotationally even to avoid taking up film at a linear rate greater than $v$. As there is nothing available to decelerate reel 90 angularly, except the tension of the film between reels, there is no way that reel 90 can decelerate so much that it will not take up film at the linear rate $v$.

Hence, it appears that the film between reels must remain taut and the entire proposition is proved. So long as the total accelerating power applied to both reels equals the total decelerating loss of power through friction, the film must all run from one reel to the other at constant linear speed.

It is readily apparent to one schooled in the art that shafts 31 and 35 can both be rotatably driven in the same direction from a single motor or other source of torque through well known torque transmitting means. It is similarly obvious that well known clutch means other than that shown and described may if desired be substituted for spring 84 without departing from the scope of my disclosure.

It is to be understood that the above embodiment of my invention is for the purpose of illustration only and various changes may be made therein without departing from the spirit and scope of the invention.

I claim:

1. For use in a camera an apparatus for moving an unexposed film past an aperture positioned at the optical axis of the camera at constant velocity comprising a coil of film initially in coiled configuration; means for applying torque to said coil to accelerate said coil to a desired constant angular velocity; means comprising a pivoted finger at times positioned entirely out of the path of the coil, but movable to a position in which the outer end intercepts the outer end of said coil for deflecting a portion of said film from said coiled configuration during rotation of said film when said coil is rotating at said desired constant velocity to provide an uncoiled portion; means for guiding said uncoiled portion of said film past said aperture; means comprising a spool for receiving said uncoiled portion of said film to form a reel upon which said uncoiled portion is subsequently coiled; means for applying torque to said spool to accelerate said spool to at least the speed of said uncoiled portion of said film, to maintain said uncoiled portion of the film taut, and to compensate for friction to maintain uniform speed of said film; and means for disconnecting the first named means for applying torque from said first named coil when the first portion of the first named coil has been deflected from said coil to form an uncoiled portion and the first named coil is free running and when the first portion of said uncoiled portion of said film has been received on said spool.

2. For use in a camera, an apparatus for continuously moving a photographic film across an aperture positioned at the optical axis of the camera comprising means including a motor, a shaft driven by said motor, a pair of plates formed with annular peripheral rings on the sides facing each other driven by said shaft for rotating a coil of photographic film at high speed and at a constant predetermined velocity, said coil being positioned between said plates and frictionally held at its outer edge by said rings; means optionally operable for diverting the outer layer of said coil of film from the rotational path of said film when said film is being rotated at said predetermined velocity; and means for guiding said film past said aperture.

3. For use in a camera, an apparatus for continuously moving a photo-sensitive material across an aperture positioned at the optical axis of the camera at high speed and at a constant predetermined velocity comprising means including a motor, a shaft driven by said motor, a pair of plates formed with annular peripheral rings on the sides facing each other driven by said shaft for rotating a coil of said photo-sensitive material at a constant uniform high speed velocity said coil being positioned between said plates and frictionally held at its outer edges by said rings; a reel on which said coil is positioned; means for detaching and guiding a leading end of said coil from the reel while the reel is being rotated at said high speed uniform velocity and past said aperture to a receiving station; a second reel at said receiving station; and means for coiling said material upon said second reel at said receiving station at the same constant uniform high velocity.

4. In a camera an aperture for moving an unexposed film past an aperture at constant velocity comprising a motor; a shaft rotated by said motor; a pair of members secured to said shaft and rotated thereby; a film disposed intermediate said members, and being at times when desired in coiled configuration, in frictional engagement with said members and rotated therewith, said film being at other times in partially uncoiled configuration and freely rotatable about said shaft; means for at times diverting a portion of said film from said coiled configuration when desired during rotation of said film; means for guiding an uncoiled portion of said film past said aperture; a source of torque; a second shaft rotated by said source of torque; a spool rotatable about said second shaft; means for rewinding said film upon said spool when it leaves said guide means; and means for transmitting from said second shaft to said spool a predetermined portion of the torque of said shaft.

5. In a camera an aparatus for continuously moving a photographic film past an aperture comprising a motor; a shaft rotated by said motor; a pair of members secured to said shaft and rotated thereby; a coil of photographic film positioned intermediate said members and rotatable about said shaft, a plurality of outer layers of said coil having opposite edges at times when desired in tight frictional engagement with and rotated by said members; means for diverting said outer layers from the rotational path of said coil when said film is accelerated to a desired velocity; means for guiding said film past said aperture; a source of torque; a second shaft rotated by said source of torque; a spool rotatable about said second shaft; means for at times securing said film to said spool when the film leaves said guiding means; and means for transmitting to said spool a predetermined portion of the torque of said second shaft to compensate for frictional losses.

6. In a camera an apparatus for continuously moving a photo-sensitive material across an optical axis at constant velocity comprising a motor; a shaft rotated by said motor; a pair of members secured to said shaft and rotated thereby; a photographic film disposed intermediate said members in coiled configuration about said shaft, and rotatable thereabout, said film having a plurality of outer layers which are at times in tight frictional engagement with both of said members, said film being rotated by said members at such times; means for at times diverting said film from its rotational path when said film is rotated at a predetermined velocity; means for guiding said film from said diverting means and across said optical axis; a source of torque; a second shaft rotated by said source of torque; a spool rotatable about said second shaft; means for at times securing said film upon said spool when said film leaves said guiding means; and means for transmitting to said spool a predetermined portion of the torque of said shaft so as to compensate for frictional losses occurring in said apparatus.

7. An apparatus for moving a flexible tape at constant velocity comprising a coil of tape initially in coiled configuration; means for applying torque to a coil of said flexible tape which is initially in coiled configuration to accelerate said coil to a desired constant angular velocity; means comprising a pivoted finger at times positioned entirely out of the path of said coil, but movable to a position in which its outer end intercepts the outer end of said coil for at times deflecting a portion of said tape from said coiled configuration during rotation of said tape at said constant velocity to provide an uncoiled portion and to disconnect the means for applying torque from said coil so that said coil rotates freely at said constant velocity; means for guiding said uncoiled portion of said tape; means comprising a spool for receiving said uncoiled portion of said tape to form a reel upon which said uncoiled portion is subsequently coiled; means for applying torque to said spool to accelerate said spool to at least the constant speed of said uncoiled portion of said tape to maintain the uncoiled portion of the tape taut and to compensate for friction to maintain uniform speed of said tape; and means for disconnecting the first named means for applying torque from said first named coil when the outer layer of the tape on said first named coil has been intercepted from the outer end of the coil and removed therefrom and the first portion of said uncoiled portion of said tape has been received on said spool.

8. An apparatus for continuously moving a flexible tape comprising means including a motor; a shaft driven by said motor; a pair of plates formed with annular peripheral rings on the sides facing each other positioned so that the distance between the peripheral rings is slightly less than the width of the flexible tape and so that the distance between the plates radially inward from said peripheral rings is slightly greater than the width of the tape and driven by said shaft for rotating a coil of said tape at high speed and at a constant predetermined angular velocity, said coil being positioned between said plates and frictionally held at its outer edge by said rings; means optionally operable for diverting the outer layer of said coil of tape from the rotational path of said tape when said tape is being rotated at said predetermined velocity whereby when the outer layers of said tape at the outer edge of said plates are diverted from said coil, the motor, shaft, and plates are disconnected from said coil, and its movement is continued only by its own inertia; and means for guiding said tape.

9. An apparatus for contiuously moving a flexible tape at high speed and at a constant predetermined velocity comprising means including a motor, a shaft driven by said motor, a pair of plates formed with annular peripheral rings on the sides facing each other driven by said shaft for rotating a coil of said tape at a constant uniform high speed angular velocity, said rings being positioned so that the distance between the peripheral rings is slightly less than the width of the flexible tape and so that the distance between the plates radially inward from said peripheral rings is slightly greater than the width of the flexible tape, said coil being positioned between said plates and frictionally held at its outer edges by said rings; a reel on which said coil is positioned; means for detaching and guiding a leading end of said coil from the reel while the reel is being rotated at said high speed uniform velocity to a receiving station; a second reel at said receiving station; means for disconnecting the motor, shaft, and plates from said coil when the leading end of said coil has been detached from said coil so that the flexible tape runs free because of its own inertia; and means for coiling said tape upon said second reel at said receiving station at the same constant uniform high velocity.

10. An apparatus for continuously moving a flexible tape comprising a motor; a shaft rotated by said motor; a pair of members secured to said shaft and rotated thereby and each formed with an inner peripheral flange; a coil of flexible tape positioned intermediate said members and rotatable about said shaft and having a width slightly less than the distance between said peripheral flanges and slightly greater than the distance between said members radially inward from said flanges, a plurality of outer layers of said coil having opposite edges at times in tight frictional engagement with and rotated by the peripheral flanges of said members; means for diverting said outer layers from the rotational path of said coil when said tape is accelerated to a desired velocity; means for guiding said tape; a source of torque; a second shaft rotated by said source of torque; a spool rotatable about said second shaft; means for at times securing said tape to said spool when the tape leaves said guiding means; and means for transmitting to said spool a predetermined portion of the torque of said second shaft to compensate for frictional losses.

11. An apparatus for continuously moving a flexible tape at constant velocity comprising a motor; a shaft rotated by said motor; a pair of members secured to said shaft and rotated thereby and each formed with an inner peripheral flange; a tape disposed intermediate said members in coiled configuration about said shaft, and rotatable thereabout, said tape having a width slightly less than the distance between said peripheral flanges and slightly greater than the distance between said members radially inward from said flanges having a plurality of outer layers which are at times in tight frictional engagement with both of said members, said tape being rotated by the peripheral flanges of said members at such times; means for at times diverting said tape from its rotational path when said tape is rotated at a predetermined velocity; means for guiding said tape from said diverting means; a source of torque; a second shaft rotated by said source of torque; a spool rotatable about said second shaft; means for at times securing said tape upon said spool when said tape leaves said guiding means; and means for transmitting to said spool a predetermined portion of the torque of said second shaft so as to compensate for frictional losses occurring in said apparatus.

References Cited in the file of this patent

UNITED STATES PATENTS

| | | |
|---|---|---|
| 1,916,108 | Hall | June 27, 1933 |
| 1,993,735 | Foster et al. | Mar. 12, 1935 |
| 2,190,058 | Doyle et al. | Feb. 13, 1940 |
| 2,400,024 | Roehrl | May 7, 1946 |
| 2,451,080 | Finch et al. | Oct. 12, 1948 |
| 2,629,646 | Warrick | Feb. 24, 1953 |
| 2,891,736 | Blaes | June 23, 1959 |

FOREIGN PATENTS

| | | |
|---|---|---|
| 255,091 | Great Britain | Sept. 29, 1927 |

UNITED STATES PATENT OFFICE
CERTIFICATE OF CORRECTION

Patent No. 3,002,424                          October 3, 1961

Carl David Miller

It is hereby certified that error appears in the above numbered patent requiring correction and that the said Letters Patent should read as corrected below.

Column 8, line 33, for "aperture" read -- apparatus --.

Signed and sealed this 24th day of April 1962.

(SEAL)
Attest:

ESTON G. JOHNSON                            DAVID L. LADD
Attesting Officer                             Commissioner of Patents